(12) United States Patent
Chen et al.

(10) Patent No.: US 10,506,346 B2
(45) Date of Patent: Dec. 10, 2019

(54) DOME TWEETER

(71) Applicant: TYMPHANY ACOUSTIC TECHNOLOGY (HUIZHOU) CO., LTD., Huizhou. Guangdong Province (CN)

(72) Inventors: Zhiwen Chen, Huizhou (CN); Hongzai Xie, Huizhou (CN)

(73) Assignee: Tymphany Acoustic Technology (Huizhou) Co., Ltd., Huizhou, Guangdong Province (CN)

( * ) Notice: Subject to any disclaimer, the term of this patent is extended or adjusted under 35 U.S.C. 154(b) by 0 days.

(21) Appl. No.: 16/017,787

(22) Filed: Jun. 25, 2018

(65) Prior Publication Data

US 2019/0098412 A1 Mar. 28, 2019

(30) Foreign Application Priority Data

Sep. 26, 2017 (CN) .......................... 2017 1 0880972

(51) Int. Cl.
| | |
|---|---|
| *H04R 7/12* | (2006.01) |
| *H04R 1/28* | (2006.01) |
| *H04R 9/06* | (2006.01) |
| *H04R 9/02* | (2006.01) |

(52) U.S. Cl.
CPC ............. *H04R 7/127* (2013.01); *H04R 1/288* (2013.01); *H04R 1/2811* (2013.01); *H04R 1/2876* (2013.01); *H04R 9/025* (2013.01); *H04R 9/06* (2013.01); *H04R 2207/021* (2013.01); *H04R 2209/022* (2013.01)

(58) Field of Classification Search
CPC ...... H04R 1/2876; H04R 1/288; H04R 7/127; H04R 9/025; H04R 9/06; H04R 2207/021; H04R 2209/022
USPC ........ 381/296, 400, 407, 412, 419, 423, 430
See application file for complete search history.

(56) References Cited

U.S. PATENT DOCUMENTS

| 6,792,127 B1 * | 9/2004 | Anthony | H04R 7/12 381/407 |
|---|---|---|---|
| 6,993,147 B2 * | 1/2006 | Guenther | H04R 11/02 381/407 |
| 7,515,728 B2 * | 4/2009 | Kobayashi | H04R 9/041 381/398 |
| 7,899,201 B2 * | 3/2011 | Foletta | H04R 1/2803 381/345 |
| 2005/0013461 A1 * | 1/2005 | Milot | H04R 7/20 381/423 |
| 2007/0195986 A1 * | 8/2007 | Geaves | H04R 7/127 381/430 |

* cited by examiner

*Primary Examiner* — Jesse A Elbin
(74) *Attorney, Agent, or Firm* — Muncy, Geissler, Olds & Lowe, P.C.

(57) ABSTRACT

This disclosure provides a dome tweeter, including a vibrating diaphragm, a surround, a voice coil, and a magnetic circuit. The vibrating diaphragm includes a dome portion. One end of the surround is connected to the dome portion of the vibrating diaphragm. The voice coil is located below the vibrating diaphragm. The magnetic circuit is located below the voice coil and includes a T-shaped yoke iron, the center of the T-shaped yoke iron is provided with a through hole, and the through hole faces a central position of the vibrating diaphragm.

9 Claims, 5 Drawing Sheets

DOME TWEETER

BACKGROUND

Technical Field

This application relates to a loudspeaker, and in particular, to a dome-type loudspeaker.

Related Art

A loudspeaker is an electroacoustic transducer mainly capable of converting current frequency to a sound and outputting the sound. The loudspeaker works as follows: a current passes through a voice coil for generating a magnetic field, and the magnetic field of the voice coil interacts with a magnetic field of a magnetic circuit so as to drive a vibrating diaphragm to vibrate for producing a sound.

Loudspeakers may be classified, according to different shapes of the vibrating diaphragm, into a conical loudspeaker, a planar loudspeaker, a dome-type loudspeaker, a horn-type loudspeaker, and the like. The dome-type loudspeaker mainly works as a median and treble loudspeaker. Dome-type loudspeakers may further be classified into a hard dome-type loudspeaker and a soft dome-type loudspeaker according to dome materials thereof.

A vibrating diaphragm material of the soft dome-type loudspeaker may be a spun silk membrane, a silk membrane, a rubber membrane, a bulletproof fabric membrane, or the like. When the soft dome-type loudspeaker plays music, it performs great in high pitch. The soft dome-type loudspeaker is suitable for playing general music, such as classical music or human voice. A vibrating diaphragm material of the hard dome-type loudspeaker may be aluminum alloy, titanium alloy, magnesium alloy, a titanium alloy lamination membrane, a glass membrane, a diamond membrane, or the like. A high pitch played by the hard dome-type loudspeaker has a bright tone and a sense of metal. The hard dome-type loudspeaker is suitable for playing pop music, movie music, and effect music.

An effective bandwidth range of an ordinary hard dome-type loudspeaker falls within 850 Hz to 15 KHz, and the sound pressure level is likely to change obviously when the bandwidth is less than 15 KHz. That is, an ordinary hard dome-type loudspeaker still has problems that the effective bandwidth range is insufficient and an SPL curve is not flat enough.

SUMMARY

In view of this, this disclosure provides a hard dome tweeter. The hard dome tweeter of this disclosure includes a vibrating diaphragm, a surround, a voice coil, and a magnetic circuit. The vibrating diaphragm includes a dome portion. One end of the surround is connected to the dome portion of the vibrating diaphragm. The voice coil is located below the vibrating diaphragm. The magnetic circuit is located below the voice coil, and the magnetic circuit includes a T-shaped yoke iron, the center of the T-shaped yoke iron is provided with a through hole, and the through hole faces a central position of the vibrating diaphragm.

In an embodiment, the vibrating diaphragm includes a first connecting portion and a second connecting portion, the first connecting portion is connected to the dome portion, the second connecting portion is connected to the first connecting portion, an extending direction of the first connecting portion is perpendicular to an extending direction of the second connecting portion, and the surround is connected to the first connecting portion, the second connecting portion, and the dome portion.

In an embodiment, the voice coil includes a bobbin and a coil, the bobbin includes an actuating portion and an extending portion, an angle is formed between the extending portion and the actuating portion, the coil sleeves over the actuating portion, the actuating portion is laminated with the first connecting portion, and the extending portion is laminated with the dome portion.

In an embodiment, the dome tweeter includes an adhesive portion that is located at a junction between the vibrating diaphragm and the bobbin of the voice coil.

In an embodiment, the adhesive portion includes an outer edge that extends from the second connecting portion to the actuating portion.

In an embodiment, the dome tweeter includes a sound-absorbing cotton, wherein the sound-absorbing cotton is located below the magnetic circuit and covers the through hole of the magnetic circuit.

In an embodiment, the dome tweeter includes a rear cavity that is sleeved over the sound-absorbing cotton.

In an embodiment, the dome tweeter includes a rear cover that covers the rear cavity and the sound-absorbing cotton.

In an embodiment, the through hole of the T-shaped yoke iron has an arc edge.

In an embodiment, the T-shaped yoke iron has a standing portion and a supporting portion, the standing portion vertically stands on the supporting portion, and the center of the standing portion is provided with the through hole.

In an embodiment, the standing portion of the T-shaped yoke iron includes a first body segment and a second body segment, the first body segment extends along a direction perpendicular to the supporting portion, and the second body segment tilts relative to the first body segment, to be in taper-shape.

The dome-type loudspeaker can effectively lower a treble resonance frequency and extend a high frequency SPL curve, so as to expand an effective bandwidth range to be 600 Hz to 20 KHz while ensuring the flatness of the SPL curve within the effective bandwidth range.

DETAILED DESCRIPTION

For convenience of reading, "above", "below", "left", and "right" specified in this specification according to the drawings are intended to specify reference relative positions between components rather than limiting this application.

Figure 1:
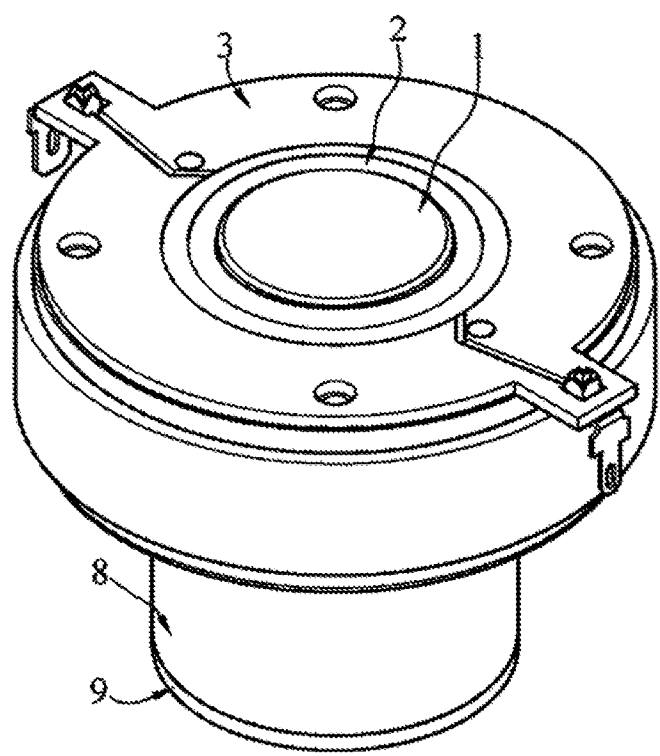
FIG. 1 is a schematic three-dimensional diagram of an embodiment of a dome tweeter according to this application.
Figure 2:
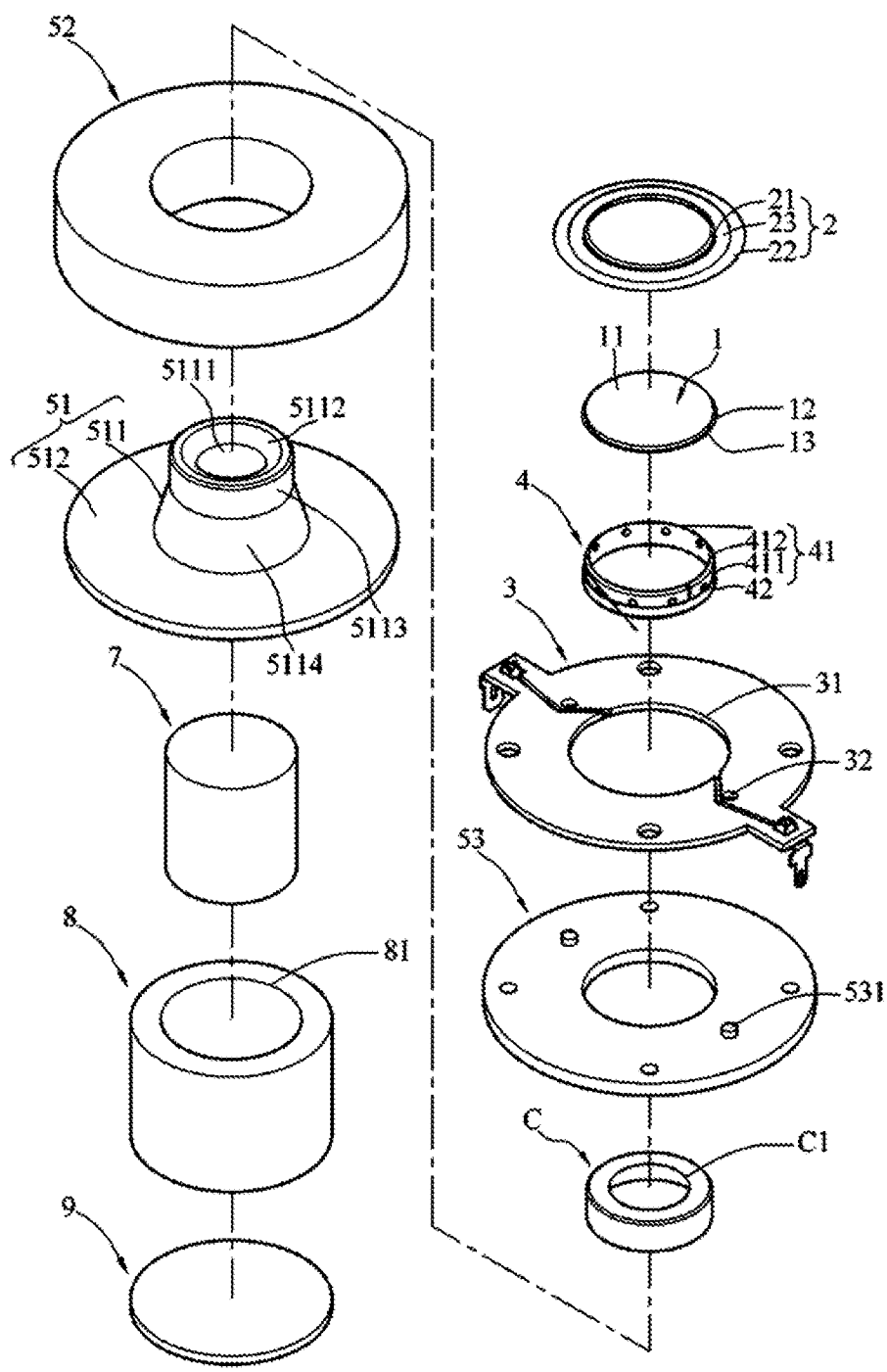
FIG. 2 is a three-dimensional structural exploded view of an embodiment of a dome tweeter according to this application.

Referring to FIG. 1 in combination with FIG. 2, FIG. 1 is a schematic three-dimensional diagram of an appearance of an embodiment of a dome tweeter according to this disclosure. FIG. 2 is a three-dimensional structural exploded view of an embodiment of a dome tweeter according to this application. An embodiment of the dome tweeter depicted in FIG. 1 and FIG. 2 includes a vibrating diaphragm 1, a surround 2, a voice coil 4, and a magnetic circuit 5. The dome tweeter may be a hard dome tweeter. The vibrating diaphragm 1 includes a dome portion 11. One end of the surround 2 is connected to the dome portion 11 of the vibrating diaphragm 1. The voice coil 4 is located below the vibrating diaphragm 1. The magnetic circuit 5 is located below the voice coil 4. The magnetic circuit 5 includes a T-shaped yoke iron 51, the center of the T-shaped yoke iron 51 is provided with a through hole 5111, and the through hole 5111 faces a central position of the vibrating diaphragm 1.

When the voice coil 4 is powered, a current passes through the voice coil 4 to generate a magnetic field. The magnetic field of the voice coil 4 interacts with a magnetic field of the magnetic circuit 5 to generate a magnetic induction force that drives the voice coil 4 to vibrate and produce a sound by using the vibrating diaphragm 1. The through hole 5111 of the T-shaped yoke iron 51 of the magnetic circuit 5 increases a space volume below the vibrating diaphragm 1. Therefore, it prolongs a reflection time of sound wave below the vibrating diaphragm 1, thereby effectively lowering the resonance frequency and expanding the effective bandwidth range.

Further, the T-shaped yoke iron 51 includes a standing portion 511 and a supporting portion 512. The standing portion 511 vertically stands on the supporting portion 512, and the through hole 5111 is located at the center of the standing portion 511. One end, which is close to the vibrating diaphragm 1, of the standing portion 511 of the T-shaped yoke iron 51 includes an arc edge 5112, and the arc edge 5112 extends to the through hole 5111. The standing portion 511 of the T-shaped yoke iron 51 includes a first body segment 5113 and a second body segment 5114, the first body segment 5113 extends along a direction perpendicular to the supporting portion 512, and the second body segment 5114 tilts relative to the first body segment 5113, to be in a taper-shape. A distance between the T-shaped yoke iron 51 and a magnet 52 is changed by means of the shape of the standing portion 511, thereby optimizing the magnetic field.

In addition, the magnetic circuit 5 further includes the magnet 52 and a concentrating flux plate 53. The magnet 52 and the concentrating flux plate 53 are both annular, and the concentrating flux plate 53 is sleeved over the standing portion 511 and abuts against the magnet 52. The T-shaped yoke iron 51 is a part of the magnetic circuit, enabling magnetic field lines to smoothly flow through the T-shaped yoke iron 51. The T-shaped yoke iron 51 and the concentrating flux plate 53 are made of a material with magneto-conductivity, and the magnet 52 is usually made of a permanent magnet.

Figure 3:
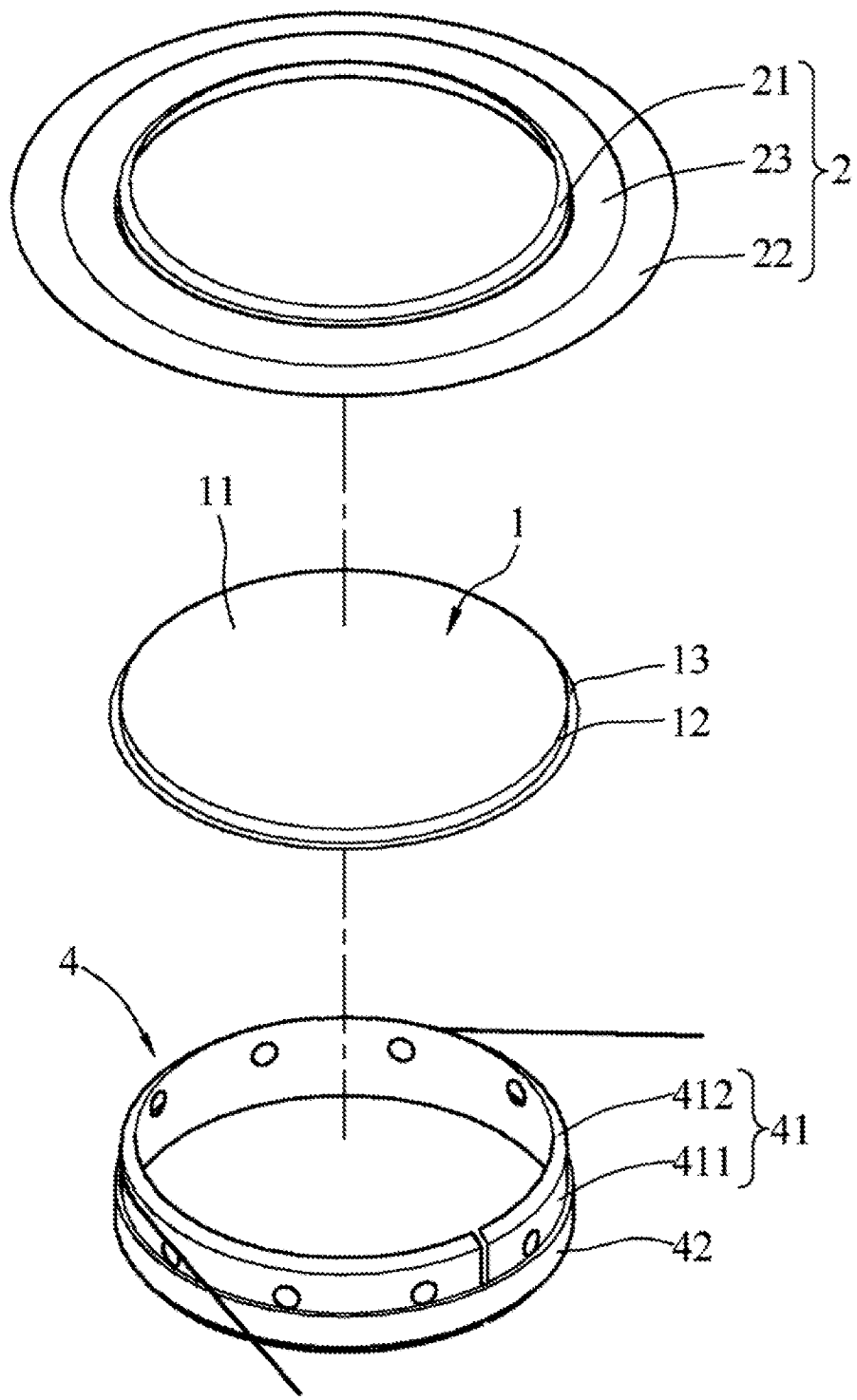
FIG. 3 is a diagram of a partial structure in FIG. 2.
Figure 4:
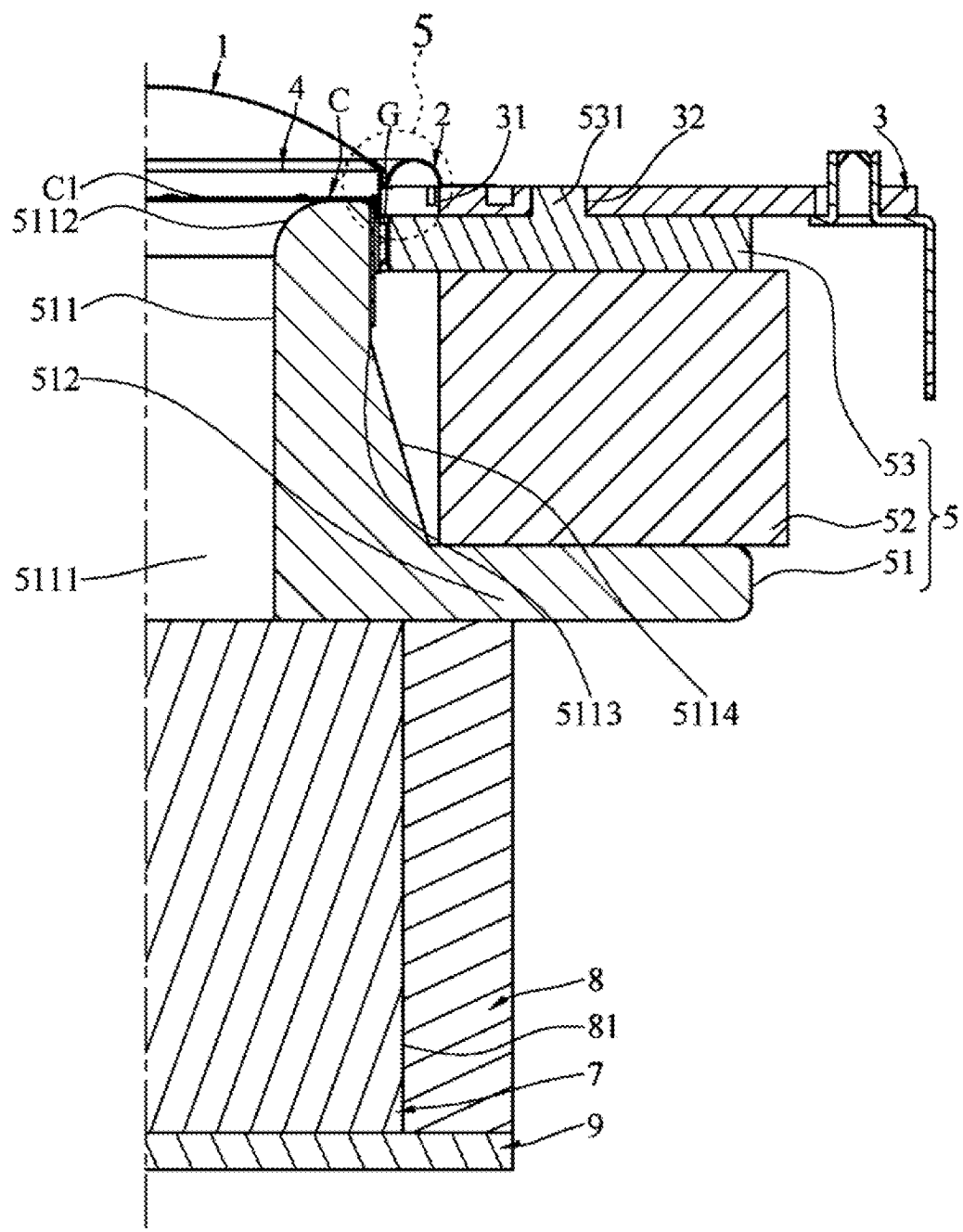
FIG. 4 is a partial sectional view of an embodiment of a dome tweeter according to this disclosure.
Figure 5:
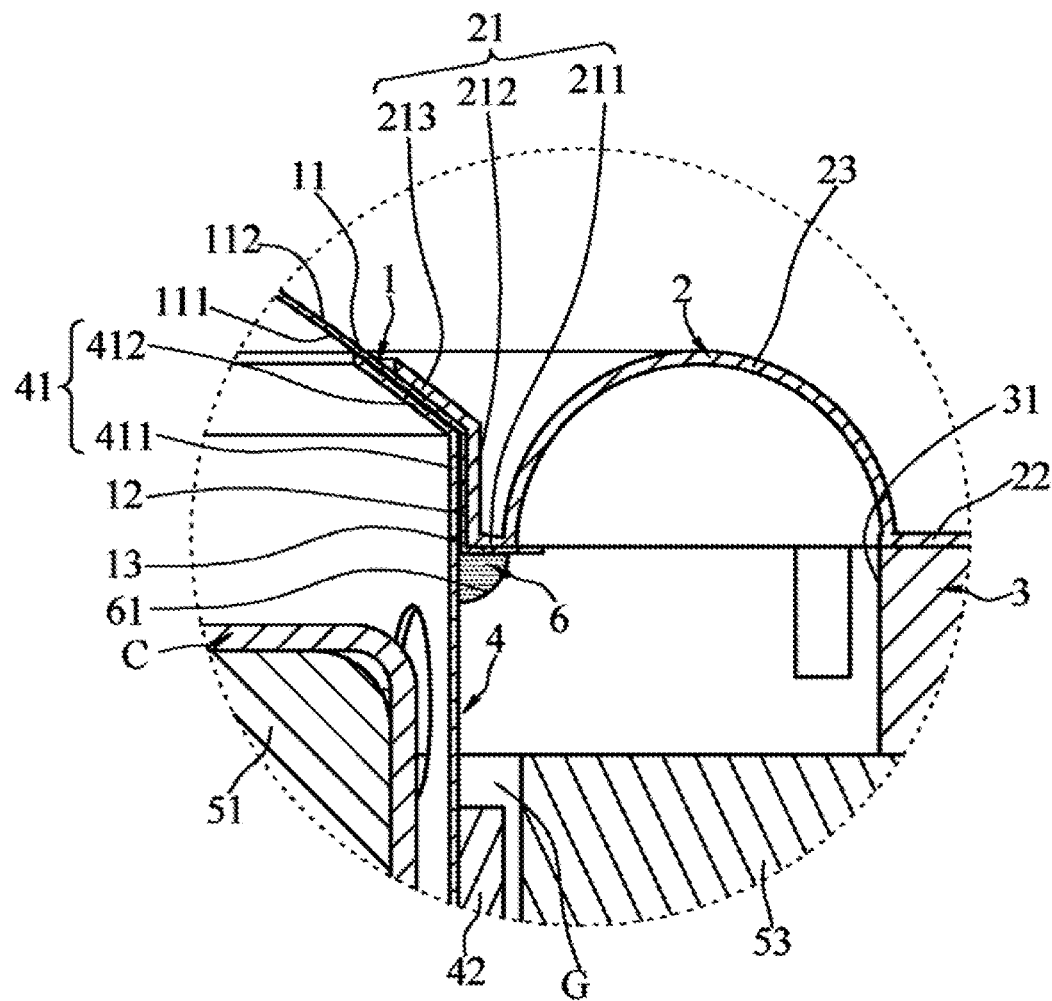
FIG. 5 is a partial enlarged view according to "part 5" in FIG. 4.

Referring to FIG. 3 to FIG. 5 in combination, in an embodiment, the vibrating diaphragm 1 is a dome-type vibrating diaphragm. The vibrating diaphragm 1 has an external profile in semicircular dome-shaped, and there is a spherical dome portion 11 within a range encircled by the external profile. The vibrating diaphragm 1 further includes a first connecting portion 12 and a second connecting portion 13. One end of the first connecting portion 12 extends downward from the dome portion 11, and the second connecting portion 13 is connected to the other end of the first connecting portion 12. In this embodiment, an extending direction of the first connecting portion 12 is substantially perpendicular to an extending direction of the second connecting portion 13. A connecting portion of the vibrating diaphragm 1 is in a bent structure, increasing the bonding intensity between the vibrating diaphragm 1 and the surround 2, and further increasing stiffness of the vibrating diaphragm 1. The vibrating diaphragm 1 may be made of a hard material such as metal, semimetal, plastic, or the like. For example, the vibrating diaphragm 1 may be, but is not limited to, aluminum alloy, titanium alloy, magnesium alloy, a titanium alloy lamination membrane, a glass membrane, or a diamond membrane.

Referring to FIG. 4 in combination with FIG. 5, the surround 2 is disposed, along the external profile of the vibrating diaphragm 1, at an outer surface 112 of an edge of the dome portion 11 of the vibrating diaphragm 1. The surround 2 includes a first end 21, a second end 22, and a buffer portion 23 located between the first end 21 and the second end 22. The first end 21 and the second end 22 are two opposite ends of the surround 2. The first end 21 of the surround 2 is laminated with the outer surface 112 of the dome portion 11, and a section of the buffer portion 23 between the first end 21 and the second end 22 of the surround 2 is inverted-U shaped. In this embodiment, the first end 21 of the surround 2 may be laminated with the first connecting portion 12, the second connecting portion 13, and the dome portion 11 of the vibrating diaphragm 1. More specifically, further referring to FIG. 4 and FIG. 5, the first end 21 of the surround 2 includes a first abutting segment 211, a second abutting segment 212, and a third abutting segment 213. One end of the first abutting segment 211 is connected to the buffer portion 23. The second abutting segment 212 is located between the other end of the first abutting segment 211 and the third abutting segment 213. The first abutting segment 211 of the surround 2 is laminated with the second connecting portion 13 of the vibrating diaphragm 1, the second abutting segment 212 is laminated with the first connecting portion 12 of the vibrating diaphragm 1, and the third abutting segment 213 is laminated with a part of the dome portion 11 of the vibrating diaphragm 1. By means of shape forming of the first end 21 of the surround 2 corresponding to the vibrating diaphragm 1, the surround 2 and the vibrating diaphragm 1 can be closely laminated with each other, and at the same time, a lamination area between the surround 2 and the vibrating diaphragm 1 is enlarged. Therefore, bonding stability of the connection between the vibrating diaphragm 1 and the surround 2 is increased, stiffness of the vibrating diaphragm 1 is further increased, a probability of occurrence of a high frequency sound valley is reduced, and the smoothness of the SPL curve is increased.

Further referring to FIG. 2, FIG. 4, and FIG. 5, the voice coil 4 includes a bobbin 41 and a coil 42, and the bobbin 41 is circular column-shaped. The coil 42 is wound around one end of the periphery of the bobbin 41, the bobbin 41 is located below a center of the dome portion 11 of the vibrating diaphragm 1, and the other end of the bobbin 41 is connected to an inner surface 111 of the vibrating diaphragm 1. A part of the T-shaped yoke iron 51 of the magnetic circuit 5 enters into the bobbin 41 of the voice coil 4, and there is a magnetic circuit gap G between the magnetic circuit 5 and the voice coil 4. The coil 42 of the voice coil 4 is located within the magnetic circuit gap G, so that the voice coil 4 can smoothly move within the magnetic circuit gap G.

Referring to FIG. 4 and FIG. 5, in an embodiment, in order to improve a contact area between the vibrating diaphragm 1 and the voice coil 4, the bobbin 41 of the voice coil 4 includes an actuating portion 411 and an extending portion 412. The actuating portion 411 is a straight cylinder structure, and the extending portion 412 extends along one end of the actuating portion 411. An angle may be formed between the extending portion 412 and the actuating portion 411. The extending portion 412 includes an arc surface, and an arc of the extending portion 412 is corresponding to an arc of the inner surface 111 of the dome portion 11 of the vibrating diaphragm 1. Therefore, the extending portion 412 of the voice coil 4 can be closely laminated with the inner surface 111 of the dome portion 11 of the vibrating diaphragm 1, and the actuating portion 411 of the voice coil 4 can be closely laminated with the first connecting portion 12 of the vibrating diaphragm 1. In this embodiment, the contact area between the vibrating diaphragm 1 and the voice coil 4 may be greatly increased, so that the voice coil 4 can more actually drive the vibrating diaphragm 1 to move, increasing sound producing efficiency and power handling. At the same time, stiffness of the contact area part is greatly improved, which is beneficial to high frequency extension of the SPL curve.

Further referring to FIG. 5, in an embodiment, the loudspeaker of this disclosure includes an adhesive portion 6. A junction between the vibrating diaphragm 1 and the voice coil 4 is filled with the adhesive portion 6, so that the vibrating diaphragm 1 and the voice coil 4 are adhered firmly. More specifically, the adhesive portion 6 in this embodiment is disposed at a position on the inner surface 111 of the dome portion 11 of the vibrating diaphragm 1 and corresponding to the extending portion 412 of the voice coil 4, disposed at the first connecting portion 12 of the vibrating diaphragm 1, and disposed at a corresponding position on the bobbin 41 of the voice coil 4. The adhesive portion 6 may overfill from the junction between the first connecting portion 12 and the second connecting portion 13 to the second connecting portion 13 of the vibrating diaphragm 1. The overfilling of the adhesive portion 6 saturates and forms an outer edge 61. The outer edge 61 is an arc edge and extends from the second connecting portion 13 of the vibrating diaphragm 1 to the actuating portion 411 of the bobbin 41 of the voice coil 4. Therefore, the adhesive portion 6 can closely bond the vibrating diaphragm 1 and the voice coil 4 together, and the overfilling of the adhesive portion 6 can further ensure the bonding stability of the joint between the vibrating diaphragm 1 and the voice coil 4, increase the stiffness of the vibrating diaphragm 1, reduce a probability of occurrence of a high frequency sound valley, and increase the smoothness of the SPL curve.

Referring to FIG. 2 in combination with FIG. 4, in an embodiment, to further increase a space volume below the vibrating diaphragm 1 and reduce interference from a standing wave, the loudspeaker of this disclosure further includes a sound-absorbing cotton 7. The sound-absorbing cotton 7 is disposed below the magnetic circuit 5. Specifically, the sound-absorbing cotton 7 is located below the T-shaped yoke iron 51 of the magnetic circuit 5 and covers the through hole 5111 of the T-shaped yoke iron 51 of the magnetic circuit 5. More specifically, the sound-absorbing cotton 7 is located at a central position of the through hole 5111 so as to directly face a central position of the dome portion 11 of the vibrating diaphragm 1. The sound-absorbing cotton 7 in this embodiment is cylindrical, but the shape of the sound-absorbing cotton 7 is not limited thereto. Therefore, the sound-absorbing cotton 7 may reduce noise, and further reduce a resonance frequency, expand an effective bandwidth range, and adjust the smoothness of acoustic resistance behind the vibrating diaphragm 1 and an overall impedance curve.

Referring to FIG. 2 and FIG. 4, in an embodiment, in order to have a complete speaker box behind the vibrating diaphragm 1, the dome tweeter further includes a rear cavity 8 and rear cover 9, which can avoid interference from a rear sound field of the vibrating diaphragm 1 on a front sound wave and prevent occurrence of an acoustic short circuit. The rear cavity 8 is enclosed outside the sound-absorbing cotton 7, and the rear cover 9 covers the rear cavity 8 and the sound-absorbing cotton 7. More specifically, the rear cavity 8 is, but not limited to, a hollow barrel structure. The rear cavity 8 in this embodiment has a sleeve hole 81 threading through two ends, and the sleeve hole 81 of the rear cavity 8 is sleeved outside the sound-absorbing cotton 7. The rear cover 9 is, but not limited to, a circular sheet body structure. A periphery profile of the rear cover 9 corresponds to a periphery profile of the rear cavity 8. The rear cover 9 is combined with one end of the rear cavity 8 to close the sleeve hole 81 of the rear cavity 8. Therefore, the space behind the vibrating diaphragm 1 is a complete closed space including the through hole 5111 of the T-shaped yoke iron 5111, the sound-absorbing cotton 7, the rear cavity 8, and the rear cover 9. In addition, the rear cavity 8 and the rear cover 9 preferably use an aluminum alloy material, helping dissipate heat from the magnetic circuit 5 and improve the bearing ability for the power.

Referring to FIG. 4 and FIG. 5, in an embodiment, the dome tweeter further includes a short circuit ring C. The short circuit ring C is sleeved over one end, which is close to the vibrating diaphragm 1, of the standing portion 511 of the T-shaped yoke iron 51 of the magnetic circuit 5. More specifically, the short circuit ring C has a central hole C1. The short circuit ring C covers a part of the arc edge 5112, and a part of the arc edge 5112 near the through hole 5111 faces the central hole C1 of the short circuit ring C. The short circuit ring C is made of a high conductive metal. The short circuit ring C in this embodiment is, but not limited to, a copper ring. Therefore, high frequency inductive reactance may be reduced, high frequency is extended, and harmonic distortion is reduced by means of electromagnetic transduction of the short circuit ring C and the effect of the magnetic field of the magnetic circuit 5.

Further referring to FIG. 2 in combination and FIG. 5, the hard dome tweeter may further include a support 3. The support 3 is of a circular structure and includes a fitting hole 31. The first end 22 of the surround 2 is connected to the support 3 along the fitting hole 31. The support 3 fits with the surround 2 to support and hang the vibrating diaphragm 1. In an embodiment, to further improve structure stability of the entire apparatus, the support 3 has a joint hole 32. The joint hole 32 is located around the fitting hole 31, and the concentrating flux plate 53 of the magnetic circuit 5 has a joint rod 531. Therefore, the joint rod 531 of the concentrating flux plate 53 of the magnetic circuit 5 may correspondingly insert into the joint hole 32 of the support 3, so that the magnetic circuit 5 is located on the support 3, thereby improving the structure stability of the entire apparatus.

Although this application is disclosed as above by using the embodiments, the embodiments are not intended to limit this specification. Any person skilled in the art can make some variations and modifications without departing from the spirit and scope of this application. Therefore, the protection scope of this application should be subject to the scope defined by the appended claims.

What is claimed is:
1. A dome tweeter, comprising:
   a vibrating diaphragm comprising a dome portion;
   a surround, one end of the surround being connected to the dome portion of the vibrating diaphragm;
   a voice coil located below the vibrating diaphragm; and a magnetic circuit located below the voice coil, wherein the magnetic circuit comprises a T-shaped yoke iron, the center of the T-shaped yoke iron is provided with a through hole, and the through hole faces a central position of the vibrating diaphragm, wherein the vibrating diaphragm comprises a first connecting portion and a second connecting portion, the first connecting portion is connected to the dome portion, the second connecting portion is connected to the first connecting portion, an extending direction of the first connecting portion being substantially perpendicular to an extending direction of the second connecting portion, and the surround is connected to the first connecting portion, the second connecting portion, and the dome portion.

2. The dome tweeter according to claim 1, wherein the T-shaped yoke iron comprises a standing portion and a supporting portion, the standing portion vertically stands on the supporting portion, and the center of the standing portion is provided with the through hole.

3. The dome tweeter according to claim 2, where the standing portion of the T-shaped yoke iron comprises a first body segment and a second body segment, the first body segment extends along a direction substantially perpendicular to the supporting portion, and the second body segment tilts relative to the first body segment, to be in a taper-shape.

4. The dome tweeter according to claim 1, wherein the voice coil comprises a bobbin and a coil, the bobbin comprises an actuating portion and an extending portion, an angle is formed between the extending portion and the actuating portion, the coil sleeves over the actuating portion, the actuating portion is laminated with the first connecting portion, and the extending portion is laminated with the dome portion.

5. The dome tweeter according to claim 4, comprising an adhesive portion located at a junction between the vibrating diaphragm and the bobbin of the voice coil.

6. The dome tweeter according to claim 5, wherein the adhesive portion comprises an outer edge extending from the second connecting portion to the actuating portion.

7. The dome tweeter according to claim 1, comprising a sound-absorbing cotton located below the magnetic circuit and covering the through hole of the magnetic circuit.

8. The dome tweeter according to claim 4, comprising a rear cavity enclosing the sound-absorbing cotton.

9. The dome tweeter according to claim 5, comprising a rear cover covering the rear cavity and the sound-absorbing cotton.

* * * * *